United States Patent Office 2,845,445
Patented July 29, 1958

2,845,445
AMINOALKYL ACYL TITANATE

Charles A. Russell, Fair Haven, N. J., assignor to National Lead Company, New York, N. Y., a corporation of New Jersey No Drawing. Application May 16, 1955
Serial No. 508,776

9 Claims. (Cl. 260—429.5)

This invention relates in general to organotitanium compounds, more specifically it relates to aminotitanium compounds.

Various titanium organic compounds are used in processes involving organic systems and such compounds are useful because of their high degree of reactivity and other chemical properties which such compounds possess.

Most prior titanium organic compounds are readily susceptible to hydrolysis thus restricting their use in anhydrous systems.

Recently assignee of the instant invention has become interested in titanium and zirconium amino compounds and has prepared stable water soluble aminoalcohol titanates. Such titanates are more fully described and claimed in co-pending application Serial No. 291,997, filed by Harry H. Beacham and Daniel F. Herman. According to co-pending application Serial No. 291,997, the aminoalcohol titanates are stable and readily soluble in aqueous systems. Because of the stability exhibited by the aminoalcohol titanates produced in Serial No. 291,997, it would be desirable to produce stable aminoalkyl titanium compounds which would be stable and soluble in non-polar organic solvents.

An object of the instant invention therefore is to produce aminotitanium compounds which are stable and resistant to hydrolysis in non-polar organic solvents. Another object is to prepare titanium amino compounds which are readily soluble in non-polar organic solvents. A still further object is to prepare colloidal aqueous solutions of aminotitanium compounds. A still further object is to provide a simple and economical method for preparing aminotitanium compounds. Another object is to prepare aminoalkyl acyl titanate compounds containing condensed titanium structures. These and other objects will become apparent from the following more complete description of the instant invention.

Broadly this invention contemplates preparing monomeric and polymeric aminoalkyl acyl titanates. The monomeric compositions contain quadrivalent titanium in which for each mole of titanium there are present four moles of co-valently bonded organic groupings selected from the group consisting of aminoalkoxy, acyloxy and alkoxy, said aminoalkoxy grouping being present in amount from 1 to 3 moles for each mole of titanium, said acyloxy grouping being present in amount from 0.2 to 2.0 moles for each mole of titanium. The alkoxy grouping is an aliphatic hydrocarbon containing from 2 to 18 carbon atoms. The acyloxy grouping contains only one carboxy group and has from 2 to 20 carbon atoms. The aminoalkoxy grouping has the general formula

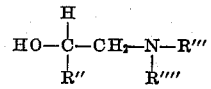

where R″ is either hydrogen or an aliphatic hydrocarbon grouping containing from 1 to 5 carbon atoms, R‴ and R″″ is a grouping selected from the group consisting of hydrogen, an aliphatic hydrocarbon containing from 1 to 20 carbon atoms, and aminoalkyl grouping containing from 2 to 9 carbon atoms and a hydroxyalkyl grouping containing from 2 to 5 carbon atoms. The polymeric compositions of the instant invention contain the same co-valently bonded grouping as the monomeric composition except that one or more of the co-valently bonded organic groupings may be replaced by an oxygen-titanium linkage of the condensed titanate structure, the maximum number of replacements by the oxygen-titanium linkage being no more than 3 per titanium atom and preferably no more than 2.

This invention further contemplates a process for preparing such compositions which comprises admixing an alkyl titanate or condensed titanate with an organic acid to form alkoxy titanium acylate and reacting the alkoxy titanium acylate with β-aminoalcohol to form the β-aminoalkyl acyl titanate compositions of the instant invention.

Substantially any alkyl titanate which has the formula Ti(OR)$_4$ where R is an aliphatic hydrocarbon containing from 2 to 18 carbon atoms may be employed for the preparation of the compositions of the instant invention. Such alkyl titanate compounds are readily available as articles of commerce.

According to the instant invention the alkyl titanate is reacted with an organic acid to form an alkoxy titanium acylate having the general formula

where $n$ is from 0.2 to 2. The organic acids which may be used in the instant invention include those which have from 2 to 20 carbon atoms and which are either saturated or unsaturated aliphatic, or aromatic in composition. Briefly such acids should not contain substitutes although the acid may contain some nonreactive halogen atoms. The acid may be either saturated or nonsaturated compounds having only one carboxyl group, however, saturated fatty acid groupings having from 12 to 18 carbon atoms are preferred. The preferred amount of organic acid employed in the alkoxy titanium acylate is from 0.2 to 2.0 moles for each mole of alkyl titanate used. If smaller amounts than 0.2 mole of organic acids are employed in the subsequent reaction with aminoalcohols the products obtained are readily soluble in water and are only slightly soluble in non-polar organic solvents, thus behaving similarly to the aminoalcohol titanates described in copending application Serial No. 291,997. Such compounds are obviously different than the readily organic soluble compounds of the instant invention. If amounts larger than 2.0 moles of organic acids are employed in the reaction between the alkyl titanate and the organic acid, the additional acid is at most only weakly bonded to the titanium atoms and therefore when subsequently reacted with the aminoalcohol forms salts with the nitrogen of the amino-alcohol, thus reducing the solubility of the product in the non-polar organic solvent.

The alkoxy titanium acylate is then reacted with the aminoalcohol to form the aminoalkyl acyl titanate. The β-aminoalcohol employed should have the general formula

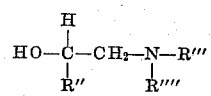

where R″ is either hydrogen or an aliphatic hydrocarbon grouping containing from 1 to 5 carbon atoms, R‴ and R″″ is a grouping selected from the group consisting of hydrogen, an aliphatic hydrocarbon containing from 1 to 20 carbon atoms, and aminoalkyl grouping containing from 2 to 9 carbon atoms. The amount of aminoalcohol employed should be from 1 mole to 3 moles for each mole of titanium ester used. If less than one mole of aminoalcohol is used for each mole of titanium ester, the product obtained is unstable and gives undesirable insoluble products. If more than 3 moles of aminoalcohol is used the product becomes less soluble in non-polar organic solvents.

In preparing the aminoalkyl acyl titanate compositions the alkyl titanate is admixed with the organic acid at room temperature or heated slightly if desired to hasten the reaction to form a clear solution of alkoxy titanium acylate. The alcohol formed during the reaction may be removed from the reaction mixture if desired, although in general the removal of the alcohol is not necessary. The alkoxy titanium acylate is then admixed with the β-aminoalcohol at room temperature to form the aminoalkyl acyl titanate composition of the instant invention.

The condensed or polymeric titanate composition is formed in the same manner as the monomeric composition except condensed alkyl titanates are used in place of the monomeric alkyl titanates. The condensed titanates employed should contain no more than three oxygen titanium linkages per titanium atom and preferably no more than two.

It has been found according to the instant invention that it is necessary to form either the monomeric or polymeric products by the sequence of steps previously described. If this sequence is not followed and instead the aminoalcohol is admixed with the titanate and the organic acid subsequently added, an aminoalkyl titanate N-salt of the acid is formed. Such a salt is undesirable and is entirely different from the product of the instant invention in that it is not readily soluble in non-polar solvents and such products tend to crystallize from solution.

In order to more fully describe the instant invention the following examples are presented.

*Example 1*

57 parts of stearic acid were added to 56.8 parts of isopropyl titanate. The mixture was stirred and warmed gently to hasten the reaction. A clear viscous straw-yellow colored liquid was obtained. To this liquid were added with stirring 29.8 parts of triethanolamine. A small amount of heat was evolved and the solution became lighter in color. The solution did not crystallize on standing.

The isopropyl alcohol which formed from the reaction was removed by heating under a vacuum of 10 mm. The resultant product was a waxy solid which was readily soluble in benzene and mineral spirits and organic solvents such as isopropyl alcohol, ethyl acetate, etc. The product was stable in the presence of atmospheric moisture but could not be dissolved in water. The triethanolamine stearoyl titanate produced when dissolved in kerosene formed a clear solution. This solution is useful as an additive for petroleum products to increase their stability.

The solution obtained before the isopropyl alcohol was removed is also soluble in organic solvents and likewise may be used for many purposes in place of the final product itself.

An aqueous colloidal dispersion of the product may also be prepared from the solution containing the alcohol by merely adding the solution to water with stirring. This aqueous colloidal solution was used to treat various fabrics. The treated fabrics possessed a high degree of water repellency which remained effective after several launderings.

*Example 2*

The procedure of Example 1 was repeated except that 20.0 parts of lauric acid were added to 28.4 parts of isopropyl titanate. 18.3 parts of monoethanolamine were then added and a clear brownish colored viscous liquid was obtained which had the properties similar to those described for the products obtained in Example 1. The monoethanolamine lauroyl titanate produced was dissolved in mineral spirits and gave a clear solution. This solution gave dispersion of pigments which were superior to pigment dispersions produced in mineral spirits alone.

*Example 3*

The procedure of Example 1 was repeated except that different agents were employed. 14.1 parts of oleic acid were added to 34 parts of butyl titanate. After the reaction was completed 31.4 parts of β-aminoethylethanolamine were added to give a clear yellowish-brown solution. The product was readily soluble in organic solvents and could be dispersed in water to give a colloidal suspension. The β-aminoethylethanolamine oleoyl titanate produced formed a clear solution when dissolved in xylene. The solution was brushed onto a ceramic body. After the solution evaporated, the thin film formed on the ceramic body made the body water repellent.

*Example 4*

The procedure of Example 1 was repeated except that 76.4 parts of triisopropanolamine were used in place of the triethanolamine. The results were similar to those obtained in Example 1 although the product was slightly easier to disperse in water.

*Example 5*

The procedure of Example 1 was again repeated except twice as much stearic acid (i. e. 114 parts) was used. The product obtained was similar to that obtained in Example 1. It was quite insoluble in water although readily soluble in organic solvents.

*Example 6*

The procedure of Example 1 was again repeated except that only 11.4 parts of stearic acid were used. Again the similar results were obtained except that a colloidal dispersion of the product in water was more easily obtained.

*Example 7*

45.3 parts of 2-ethylbutyl titanate were added to 15.8 parts of pelargonic acid. Heat was evolved and a clear yellowish-orange liquid was obtained. 13.3 parts of diisopropanolamine were then added and a clear viscous yellow liquid was formed. Again the product was insoluble in water but readily soluble in organic solvents.

*Example 8*

6 parts of acetic acid were added to 34 parts of butyl titanate. A considerable quantity of heat was evolved. 26.6 parts of N-ethyldiethanolamine were then added. The clear yellow liquid product was readily soluble in mineral spirits, kerosene, etc. to give clear solutions.

*Example 9*

12.2 parts of benzoic acid were added to 28.4 parts of isopropyl titanate. The heat of the reaction removed most of the isopropyl alcohol formed and a waxy solid product was formed. 14.9 parts of triethanolamine were then added and the mixture was heated and stirred. A clear yellow viscous solution was formed which was soluble in organic solvents.

*Example 10*

The procedure of Example 9 was repeated using 15.7 parts of p-chlorobenzoic acid in place of the benzoic acid. The product had about the same chemical and physical properties as in Example 9.

In order to describe the preparation of a condensed titanate composition, the following example is presented.

*Example 11*

340 parts of butyl titanate were dissolved in 340 parts of butyl alcohol. To this were added slowly with stirring, 1,000 parts of butyl alcohol containing 9 parts of water to produce a solution of condensed butyl titanate. After the addition was complete, 284 parts of stearic acid were added to the condensed titanate solution and the mixture warmed and stirred until solution was complete. 149 parts of triethanolamine were then added and 1,000 parts of butyl alcohol were removed by stripping at a pressure of 10 mm. The product was a thick syrupy yellowish-brown liquid which was readily soluble in benzene and mineral spirits. When added to water and shaken vigorously, a soap-like emulsion was produced.

From the above description and by the examples shown, both the monomeric and polymeric compositions produced by the instant invention are readily soluble and resistant to hydrolysis in non-polar organic solvents. The compositions of the instant invention are useful for many purposes such as additives in organic systems, for example, fuel oils, solvent systems for purposes of dispersion and for many other purposes. Such compositions are particularly useful for a variety of uses because of their high stability in non-polar organic solvents since most organic systems contain small quantities of moisture and these compounds are not effected by such systems.

It has also been shown that the products of the instant invention also can be dispersed in aqueous systems to give colloidal dispersions and solutions. Such colloidal solutions may be used for a variety of purposes including water repellent treatments, dispersing media and treatments to impart surface activity of various bodies.

While this invention has been described and illustrated by the examples shown, it is not intended to be strictly limited thereto, and other variations and modifications may be employed within the scope of the following claims.

I claim:

1. β-Aminoalkyl acyl titanate composition comprising quadrivalent titanium co-valently bonded with 4 moles of organic groupings selected from the group consisting of β-aminoalkoxy, acyloxy and lower alkoxy, said β-aminoalkoxy grouping being present in amount from 1 to 3 moles for each mole of titanium, said acyloxy grouping being present in amount from 0.2 to 2 moles for each mole of titanium, said alkoxy grouping being a saturated lower aliphatic hydrocarbon, said acyloxy grouping containing only one carboxyl group and having from 2 to 20 carbon atoms, said acyloxy grouping selected from the group consisting of saturated and unsaturated aliphatic and aromatic groupings, said aminoalkoxy grouping having the general formula

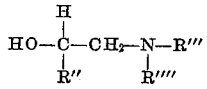

where R" is a grouping selected from the group consisting of hydrogen and an aliphatic hydrocarbon containing from 1 to 5 carbon atoms, R'" and R"" is a grouping selected from the group consisting of hydrogen, lower alkyl, an aminoalkyl grouping containing from 2 to 9 carbon atoms and a hydroxyalkyl grouping containing from 2 to 5 carbon atoms.

2. Composition according to claim 1 in which oxygen-titanium linkage of the condensed titanate structure replaces some of the co-valently bonded groupings, the number of replacements of the co-valently bonded groupings by the oxygen-titanium linkage being from 1 to 3 per titanium atoms, said compositition thus forming a polymeric structure.

3. Composition according to claim 1 in which the aminoalkyl grouping is that of triethanolamine.

4. Composition according to claim 1 in which the aminoalkyl grouping is that of diisopropanolamine.

5. Composition according to claim 1 in which the aminoalkyl grouping is that of triisopropanolamine.

6. Composition according to claim 1 in which the aminoalkyl grouping is that of β-aminoethylethanolamine.

7. Composition according to claim 1 in which the acyloxy grouping is a saturated fatty acid grouping containing from 12 to 18 carbon atoms.

8. Method for preparation of an aminoalkyl acyl covalently bonded titanate composition which comprises admixing 1 mole of alkoxy titanium acylate and 1 to 3 moles of a β-aminoalcohol, said alkoxy titanium acylate having the general formula $(RO)_{4-n}Ti(OCOR')_n$ where $n$ is from 0.2 to 2, where R is a lower alkyl and R' is an aliphatic hydrocarbon containing from 2 to 18 carbon atoms, said hydrocarbon selected from the group consisting of saturated and unsaturated groupings, said β-aminoalcohol having the general formula

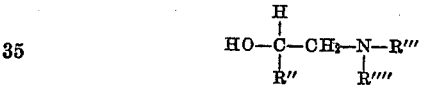

where R" is a grouping selected from the group consisting of hydrogen and an aliphatic hydrocarbon grouping containing from 1 to 5 carbon atoms, R'" and R"" is a grouping selected from the group consisting of hydrogen, lower alkyl, an aminoalkyl grouping containing from 2 to 9 carbon atoms and a hydroxyalkyl grouping containing from 2 to 5 carbon atoms, said composition having quadrivalent titanium covalently bonded with 4 moles of organic groupings selected from the group consisiting of β-aminoalkoxy, acyloxy and alkoxy, said β-aminoalkoxy grouping being present in an amount from 1 to 3 moles for each mole of titanium, said acyloxy grouping being present in amount from 0.2 to 2.0 moles for each mole of titanium, said alkoxy grouping being a saturated lower aliphatic hydrocarbon, said composition being stable and soluble in non-polar organic solvents but insoluble in aqueous media.

9. Method according to claim 8 in which the alkoxy titanium acylate employed is a condensed alkoxy titanium acylate.

No references cited.